(12) United States Patent
Yach et al.

(10) Patent No.: US 8,051,987 B2
(45) Date of Patent: *Nov. 8, 2011

(54) SYSTEM AND METHOD FOR WIRELESSLY PROVISIONING A MOBILE COMMUNICATION DEVICE

(75) Inventors: David P. Yach, Waterloo (CA); Herbert A. Little, Waterloo (CA)

(73) Assignee: Research In Motion Limited, Waterloo (CA)

( * ) Notice: Subject to any disclaimer, the term of this patent is extended or adjusted under 35 U.S.C. 154(b) by 495 days.

This patent is subject to a terminal disclaimer.

(21) Appl. No.: 12/193,934

(22) Filed: Aug. 19, 2008

(65) Prior Publication Data

US 2008/0305776 A1 Dec. 11, 2008

Related U.S. Application Data

(63) Continuation of application No. 11/017,560, filed on Dec. 20, 2004, now Pat. No. 7,430,581.

(60) Provisional application No. 60/536,461, filed on Jan. 14, 2004.

(51) Int. Cl.
*G06F 15/16* (2006.01)

(52) U.S. Cl. ........ 209/206; 709/203; 709/217; 709/220; 709/227

(58) Field of Classification Search .................. 709/203, 709/206, 217, 220, 227
See application file for complete search history.

(56) References Cited

U.S. PATENT DOCUMENTS

| 5,742,905 | A | 4/1998 | Pepe et al. |
|---|---|---|---|
| 6,813,489 | B1 | 11/2004 | Wu et al. |
| 6,850,757 | B2 | 2/2005 | Watanabe et al. |
| 7,143,118 | B2 | 11/2006 | Eichstaedt et al. |
| 2002/0173339 | A1 | 11/2002 | Safadi |
| 2003/0135554 | A1 | 7/2003 | Bellotti et al. |
| 2004/0122907 | A1 | 6/2004 | Chou et al. |
| 2004/0255034 | A1* | 12/2004 | Choi ............................ 709/229 |
| 2005/0015505 | A1 | 1/2005 | Kruis et al. |
| 2005/0033830 | A1 | 2/2005 | Gorty |
| 2005/0097175 | A1 | 5/2005 | Vandeputte |

(Continued)

FOREIGN PATENT DOCUMENTS

| CA | 2356823 | 9/2001 |
|---|---|---|
| EP | 1 206 073 A2 | 5/2002 |
| EP | 1 482 702 A1 | 12/2004 |
| WO | 99/65256 | 12/1999 |

OTHER PUBLICATIONS

EPO: Communication regarding supplementary European search report for Application No. 04802337.8 dated Mar. 16, 2007 (3 pgs).

(Continued)

*Primary Examiner* — Phuoc Nguyen

(74) *Attorney, Agent, or Firm* — Jones Day

(57) ABSTRACT

Systems and methods for wirelessly provisioning a mobile communication device are provided. To provision the mobile communication device to operate with an electronic messaging system, a provisioning request message may be generated at the mobile communication device. The provisioning request message may include a wireless identification for identifying the mobile communication device in a wireless network. The provisioning request message may be transmitted from the mobile communication device to the electronic messaging system using a pre-established communication link. In response to detecting the provisioning request message, the electronic messaging system may be provisioned by storing the wireless identification for use in communicating with the mobile communication device.

16 Claims, 5 Drawing Sheets

U.S. PATENT DOCUMENTS

2005/0102422 A1* 5/2005 Yamamote et al. ........... 709/238
2005/0240672 A1 10/2005 Chen et al.
2006/0190530 A1 8/2006 Gruneberg et al.
2007/0220099 A1 9/2007 Di Giorgio et al.

OTHER PUBLICATIONS

CIPO: Requisition by the Examiner (office action) for Canadian patent application No. 2553209 dated Aug. 31, 2010 (2 pages).

* cited by examiner

32

```
TO: USER@MAIL.NET

FROM: 123@NETWORK.NET

SUBJECT: PROVISIONING REQUEST

PIN = 123 — 42
PASSWORD = ASE1244Q — 44
```
— 46

```
TO: 123@NETWORK.NET

FROM: USER@MAIL.NET

SUBJECT: PROVISIONING RESPONSE

ID = 123.456.789.123 — 52
PASSWORD = ASE1244Q — 54
```
— 56

SYSTEM AND METHOD FOR WIRELESSLY PROVISIONING A MOBILE COMMUNICATION DEVICE

CROSS-REFERENCE TO RELATED APPLICATION

This is a continuation of U.S. patent application Ser. No. 11/017,560, filed on Dec. 20, 2004, which claims the benefit of U.S. Provisional Application No. 60/536,461, filed on Jan. 14, 2004, the entire disclosure of which is incorporated herein by reference.

FIELD

The technology described in this patent document relates generally to the field of wireless communications. More particularly, the patent document describes a system and method for wirelessly provisioning a mobile communication device.

BACKGROUND AND SUMMARY

Systems for sending and receiving electronic messages (email) using a mobile communication device are known. However, before a mobile communication device may be used to send and receive email, the device must typically be provisioned with an electronic mail service. Provisioning is a general term that is commonly used in the field of mobile communications in reference to the process by which services provided by a service provider are managed.

The technology described in this patent document provides systems and methods for wirelessly provisioning a mobile communication device, such as a cellular telephone, a two-way paging device, a personal digital assistant, or other such device. To provision the mobile communication device to operate with an electronic messaging system, a provisioning request message may be generated at the mobile communication device. The provisioning request message may include a wireless identification for identifying the mobile communication device in a wireless network. The provisioning request message may be transmitted from the mobile communication device to the electronic messaging system using a pre-established communication link. In response to detecting the provisioning request message, the electronic messaging system may be provisioned by storing the wireless identification for use in communicating with the mobile communication device.

In addition, a mobile communication device may be wirelessly provisioned to operate with an enterprise server. The enterprise server may be operable to communicate with a wireless gateway over a computer network to redirect electronic messages from an electronic mail (email) account to the mobile communication device. A provisioning request message may be generated at the mobile communication device that includes a wireless identification for identifying the mobile communication device in a wireless network and also includes an email address identifying the email account. The provisioning request message may be transmitted over the wireless network to the wireless gateway. The email address may be used to transmit the provisioning request message to the email account using an email transfer protocol. The enterprise server may monitor the email account to detect the provisioning request message, and in response to detecting the provisioning request message, may store the wireless identification for redirecting email to the mobile communication device.

BRIEF DESCRIPTION OF THE DRAWINGS

FIG. 3 illustrates an example provisioning request message;

FIG. 4 illustrates an example provisioning response message;

DETAILED DESCRIPTION

Figure 1:
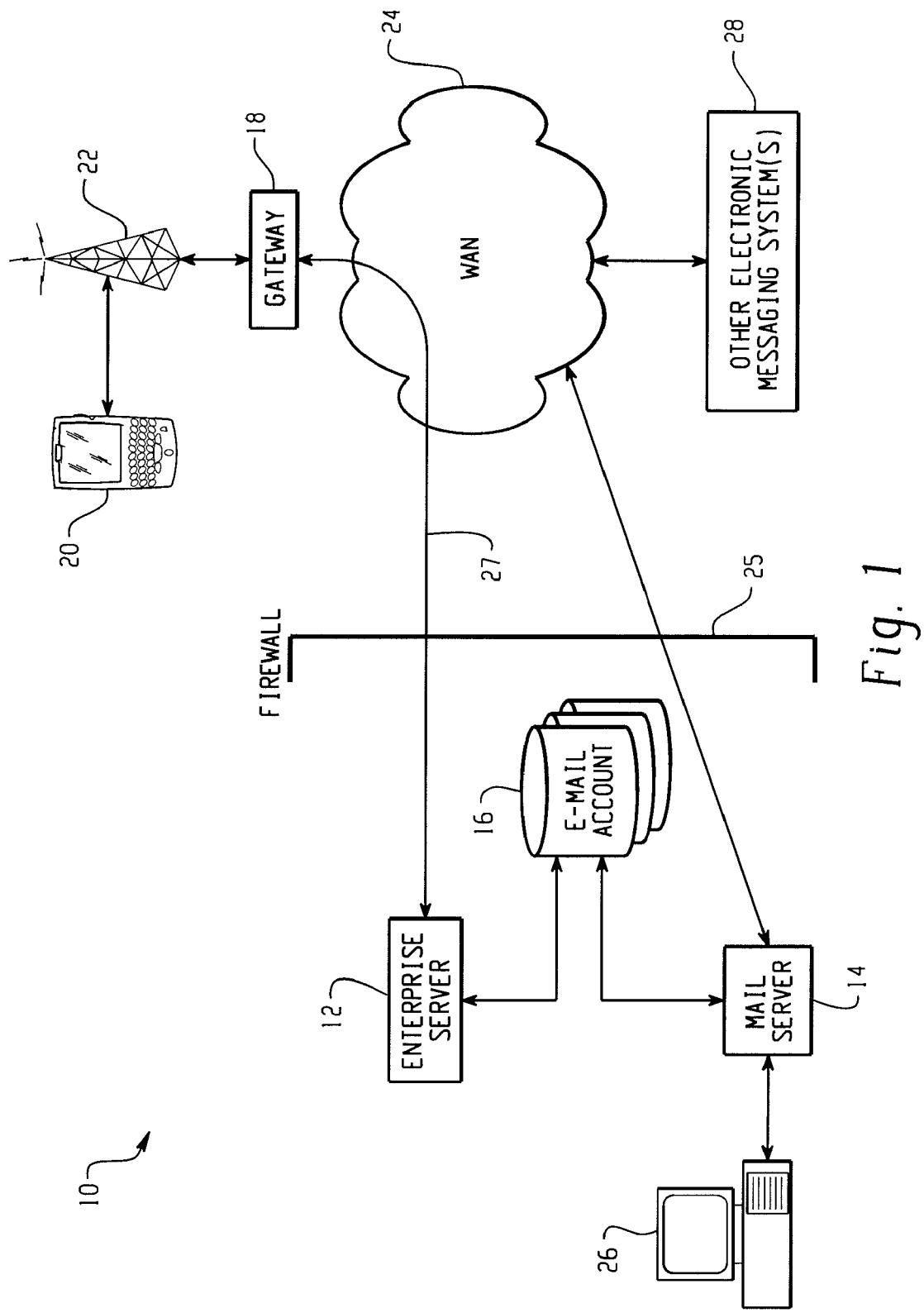
FIG. 1 is a block diagram of an example system for redirecting electronic messages to a mobile communication device.

With reference now to the drawing figures, FIG. 1 is a block diagram of an example system 10 for redirecting electronic messages to a mobile communication device 20. The example redirection system 10 includes an enterprise server 12, a mail server 14, a storage medium 16 for electronic messaging (email) account data, and a wireless gateway 18. Also illustrated are the mobile communication device 20, a wireless network 22, a wide area network (WAN) 24, a firewall 25, a computer 26, and one or more other electronic messaging systems 28.

The mail server 14 may include electronic messaging software executing on a computer within a local area computer network (LAN). The mail server 14 is coupled to local network devices 12, 16, 26 via the LAN, and is coupled to remote network devices 18, 28 via the WAN 24. The LAN and WAN 24 may be separated by a firewall 25.

The mail server 14 maintains an electronic mail (email) account within the email account database 16 for each computer 26 in the LAN. The email account database 16 may be one or more storage devices coupled to the mail server 14, and may be included within the same network device as the mail server 14 or in one or more separate devices within the LAN. The computer 26 may be one of a plurality of computers (e.g., personal computers, terminals, laptop computers, or other processing devices) coupled to the mail server 14 via the LAN that execute electronic messaging software to send and receive electronic messages (email) via the mail server.

Electronic messages sent from the computer 26 are stored by the mail server 14 in an outgoing message storage location (an "outbox") within a corresponding email account 16. If the outgoing message is addressed to an email account within the LAN, then the mail server 14 delivers the message to an incoming message storage location (an "inbox") in the appropriate email account 16. If the outgoing message is addressed to an email account in another electronic messaging system 28, however, then the message is delivered via the WAN 24. Similarly, incoming electronic mail (email) addressed to the email account 16 is received by the mail server 14 and stored to the email account database 16 within the appropriate incoming message storage location ("inbox"). The incoming email may then be retrieved from the email account 16 by the computer 26, or may be automatically pushed to the computer 26 by the mail server 14.

The enterprise server 12 may include electronic mail (email) redirection software executing on a computer within the LAN. The enterprise server 12 is operational to redirect electronic mail messages (email) from the email account 16 to the mobile communication device 20 and to place messages sent from the mobile communication device 20 into the email account 16 for delivery by the mail server 14. The enterprise server 12 stores mobile device information, such as a wireless identification (e.g., a PIN), used to communicate with the mobile communication device 20. (See, e.g., FIGS. 2-5). The enterprise server 12 may, for example, communicate with the mobile communication device 20 using a direct TCP/IP level connection 27 with the wireless gateway 18, which provides an interface between the WAN 24 and the wireless network 22.

When an electronic message (email) is received in the inbox of the email account 16, the email is detected by the enterprise server 12, and a copy of the message and any necessary mobile device information are sent over the WAN 24 to the wireless gateway 18. For example, the enterprise server 12 may encapsulate a copy of the message into one or more data packets along with a wireless identification (e.g., a PIN) for the mobile communication device 20, and transmit the data packet(s) to the wireless gateway 18 over a direct TCP/IP level connection 27. The wireless gateway 18 may then use the wireless identification and/or other mobile device information to transmit the data packets(s) containing the electronic message over the wireless network 22 to the mobile communication device 20.

Electronic messages sent from the mobile communication device 20 may be encapsulated into one or more data packets along with a network identification for the enterprise server 12 and are then transmitted over the wireless network 22 to the wireless gateway 18. The wireless gateway 18 may use the network identification for the enterprise server 12 to forward the data packet(s) over the WAN 24 to the enterprise server 12, preferably via a direct TCP/IP level connection 27. Upon receiving the data packet(s) from the wireless gateway 18, the enterprise server 12 places the enclosed electronic message (email) into the outbox of the associated email account 16. The mail server 14 then detects the email in the outbox and delivers the message, as described above.

In addition, security may be maintained outside of the firewall 25 by encrypting all electronic messages sent between the enterprise server 12 and the mobile communication device 20. For instance, an electronic message to be redirected to the mobile communication device 20 may be encrypted and compressed by the enterprise server 12, and the encrypted message may then be encapsulated into one or more data packets for delivery to the mobile communication device 20. To maintain security, the electronic message may remain encrypted over the entire communication path 18, 22, 24, 27 from the enterprise server 12 to the mobile communication device 20. Similarly, electronic messages sent from the mobile communication device 20 may be encrypted and compressed by the mobile communication device 20 before being packetized and transmitted to the enterprise server 12, and may remain encrypted over the entire communication path 18, 22, 24, 27 from the mobile communication device 20 to the enterprise server 12.

Figure 2:
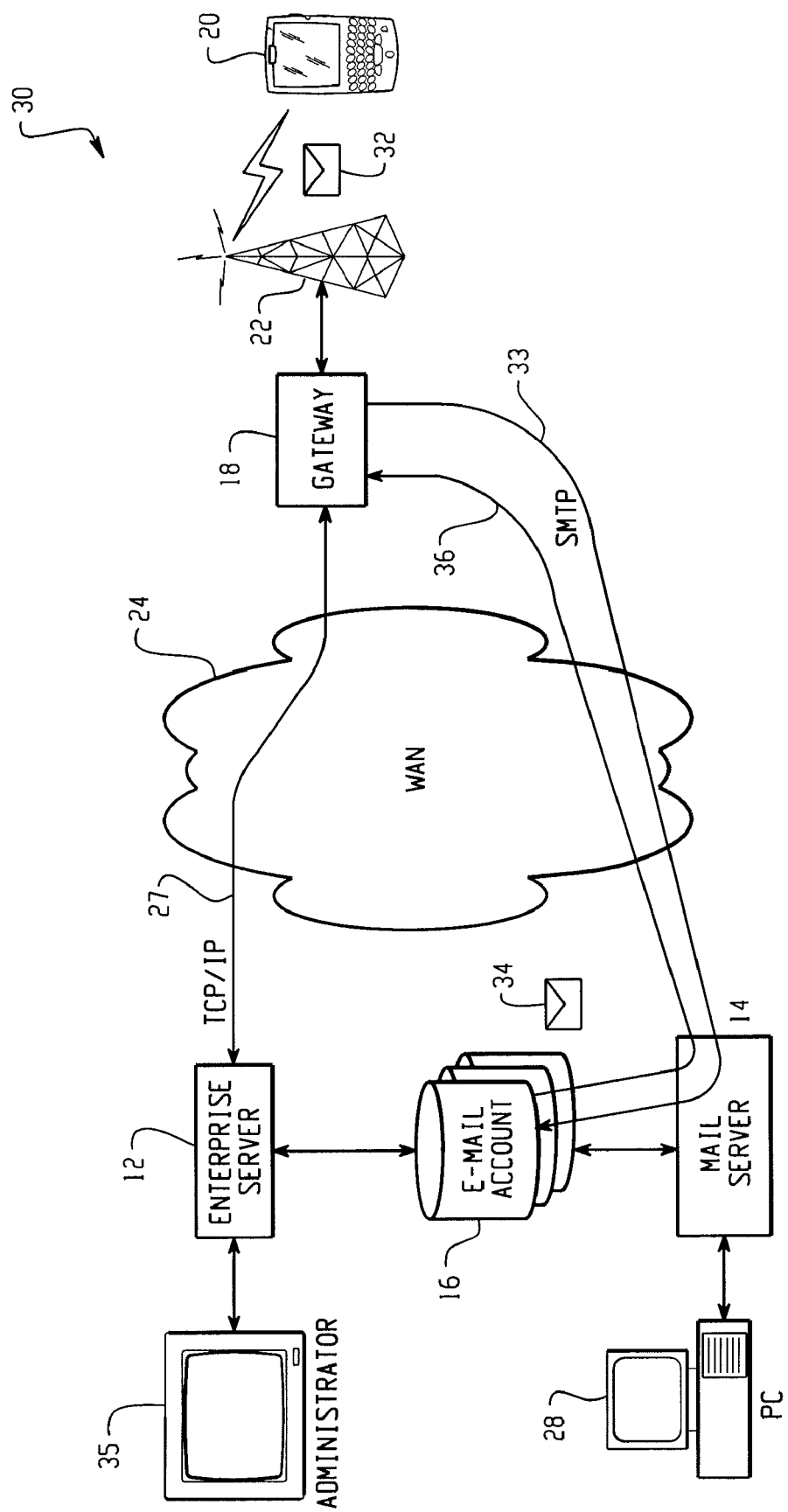
FIG. 2 is a block diagram illustrating an example procedure for wirelessly provisioning a mobile communication device within the example redirection system of FIG. 1.

FIG. 2 is a block diagram illustrating an example system 30 for wirelessly provisioning a mobile communication device 20 within the example redirection system 10 of FIG. 1. The illustrated system 30 may, for example, be used to provision a new mobile communication device 20 to operate with the enterprise server 12. The provisioning procedure 30 is initiated by the mobile communication device 20 by sending a provisioning request message 32 in the form of an electronic mail (email) message addressed to the email account 16 from which email is to be redirected.

An example provisioning request message 32 is illustrated in FIG. 3. As illustrated, the body of the provisioning request message 32 may include a wireless identification 42, such as a PIN, and a password 44. The wireless identification 42 may, for example, be automatically entered by the mobile communication device 20 or may be manually entered by a device user. The password 44 is preferably entered by the device user to ensure that the provisioning request message 32 is from a valid mobile communication device 20. The password 44 may, for instance, be obtained by contacting a system administrator 35 for the enterprise server 12, may be provided when the mobile communication device 20 is purchased, or may be obtained using some other secure means. In addition to the wireless identification 42 and password 44, the provisioning request message 32 also includes a provisioning request indicator 46. The provisioning request indicator 46 may, for example, be a pre-determined word or phrase (e.g., "provisioning request") included in the subject field of the provisioning request message 32.

Referring again to FIG. 2, the provisioning request message 32 is transmitted from the mobile communication device 20 to the wireless gateway 18 via the wireless network 22. The wireless gateway 18 then forwards the provisioning request message 32 to the electronic mail account 16 using an email transfer protocol, such as SMTP (simple mail transfer protocol).

The enterprise server 12 monitors the email accounts 16 for received electronic messages that include the provisioning request indicator 46. For example, the enterprise server 12 may monitor the subject fields of received emails for the phrase "provisioning request," as illustrated in FIG. 3. Upon detecting a provisioning request message 32 in the inbox of an email account 16, the enterprise server 12 verifies the password 44. If the password 44 is valid, then the enterprise server 12 provisions itself by creating a redirection account for the mobile communication device 20 and storing the wireless identification 42. In addition, the enterprise server 12 may enable communication with the mobile communication device 20 over a direct link 27, such as a direct TCP/IP level connection, by generating a provisioning response message 34 for delivery to the mobile communication device 20.

An example provisioning response message 34 is illustrated in FIG. 4. The provisioning response message 34 is addressed with an email address for the mobile communication device 20 and includes a network identification 52 in the message body that may be used by the mobile communication device 20 to communicate with the enterprise server 12 over the direct link 27. In addition, the provisioning response message 34 may include a password 54 to verify the authenticity of the message and a provisioning response indicator 56 to notify the mobile communication device 20 that the message 34 is a provisioning response message.

Referring again to FIG. 2, the provisioning response message 34 may be placed in the outbox of the email account 16 by the enterprise sever 12 for delivery by the mail server 14. The mail server 14 delivers the provisioning response message 34 to the wireless gateway 18 using an email transfer protocol, such as SMTP. The mobile communication device 20 may, for example, have an associated wireless email account that is maintained by the wireless gateway 18 in order to send and receive email using the email transfer protocol. Upon receiving the provisioning response message 34 addressed to the mobile communication device 20, the wireless gateway 18 transmits the message 34 over the wireless network 22 to the mobile communication device 20. The mobile communication device 20 may then detect the provisioning response indicator 56 in the received message, verify the password 54, and provision itself with the network identification 52 for the enterprise server. Electronic messages may then be transmitted between the enterprise server 12 and the mobile communication device 20, as described above with reference to FIG. 1.

The enterprise server 12 illustrated in FIG. 2 may include a communication subsystem, a memory subsystem and a processing subsystem. The communication subsystem may be operable to communicate with the wireless gateway 18 via the WAN 24. The memory subsystem may be operable to store data and program information. The processing subsystem may be operable to store and retrieve data in the memory subsystem and execute programs stored in the memory subsystem, and to cause the communication subsystem to transmit and receive information over the WAN 24. The enterprise server 12 may also include a provisioning program stored in the memory subsystem and executed by the processing subsystem to perform the provisioning functions described above.

Figure 5:
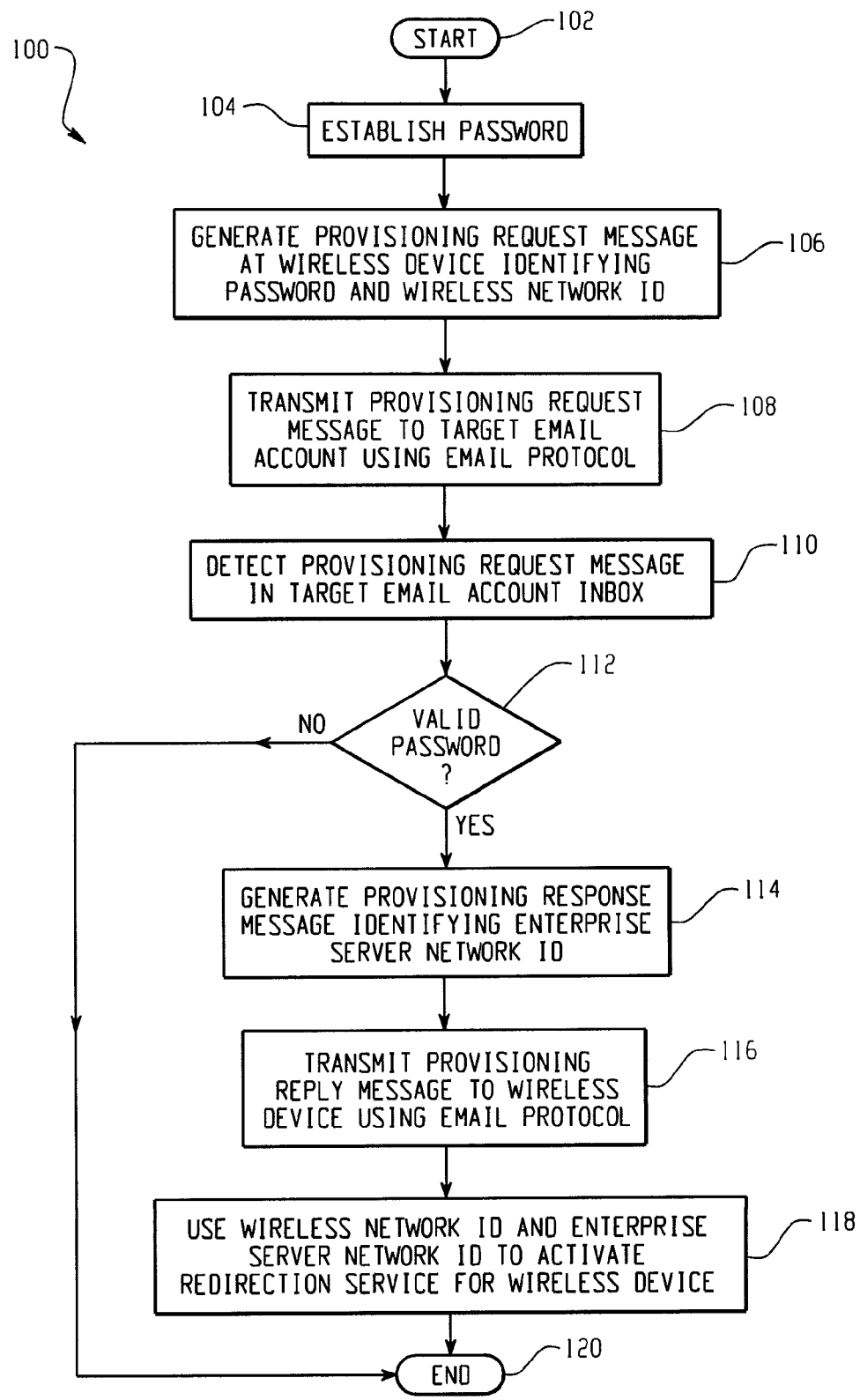
FIG. 5 is a flow diagram illustrating an example method for wirelessly provisioning a mobile communication device.

FIG. 5 is a flow diagram illustrating an example method 100 for wirelessly provisioning a mobile communication device. The method begins at step 102. At step 104, a password is established. For example, a password may be established by contacting a system administrator, using information provided with the purchase of the mobile communication device, or by some other secure means. Once a password is established, a provisioning request message is generated by the mobile communication device at step 106 that includes the password and also includes a wireless identification identifying the mobile communication device in a wireless network.

At step 108, the provisioning request message is transmitted from the mobile communication device to a target electronic mail (email) account using an email transfer protocol, such as SMTP. The target email account may be an email account in a email redirection system that is to be associated with the mobile communication device for the purpose of redirecting email, as described above. At step 110, the provisioning request message is detected in the target email account. For example, the provisioning request message may be detected in the inbox of the target email account using a provisioning request identifier included within the message.

At step 112, the password included in the provisioning request message is verified. If the password is invalid, then the method ends at step 120. Otherwise, if the password is valid, then the method proceeds to step 114. At step 114, a provisioning response message is generated that identifies a network identification for an enterprise server. The provisioning response message is then transmitted to the mobile communication device at step 116 using an email transfer protocol, such as SMTP. At step 118, the wireless network identification included in the provisioning request message and the enterprise server network identification included in the provisioning response message are used to activate a redirection service for the mobile communication device. The method then ends at step 120.

Figure 6:
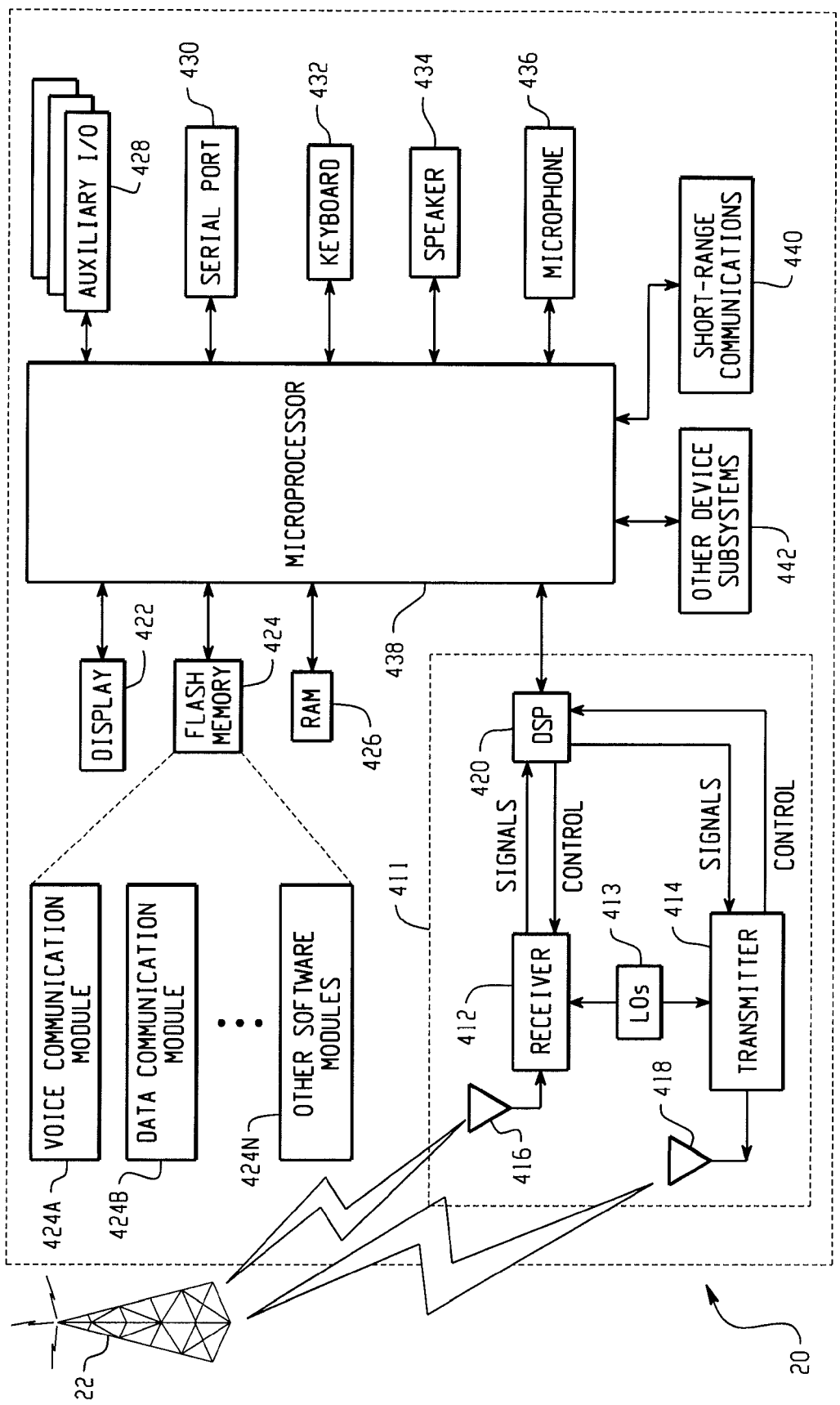
FIG. 6 is a block diagram of an example mobile communication device.

FIG. 6 is a block diagram illustrating an example mobile communication device 20. The mobile communication device 20 includes a processing subsystem 438, a communications subsystem 411, a short-range communications subsystem 440, a memory subsystem 424, 426, and various other device subsystems and/or software modules 442. The mobile communication device 20 also includes a user interface, which may include a display 422, a keyboard 430, a speaker 432, a microphone 436, one or more auxiliary input/output devices 428, a serial port 430, and/or other user interface devices.

The processing subsystem 438 controls the overall operation of the mobile communication device 20. Operating system software executed by the processing subsystem 438 may be stored in a persistent store, such as a flash memory 424, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 426. Communication signals received by the mobile communication device 20 may also be stored to RAM 426.

The processing subsystem 438, in addition to its operating system functions, enables execution of software applications 424 on the device 20. A predetermined set of applications that control basic device operations, such as data and voice communications, may be installed on the device 20 during manufacture. In addition, a personal information manager (PIM) application, including an electronic messaging application, may be installed on the device. The PIM may, for example, be operable to organize and manage data items, such as email, calendar events, voice mails, appointments, and task items. The PIM application may also be operable to send and receive data items via the wireless network 22.

Communication functions, including data and voice communications, are performed through the communication subsystem 411, and possibly through the short-range communications subsystem 440. The communication subsystem 411 includes a receiver 412, a transmitter 414 and one or more antennas 416, 418. In addition, the communication subsystem 411 also includes a processing module, such as a digital signal processor (DSP) 420 or other processing device(s), and local oscillators (LOs) 413. The specific design and implementation of the communication subsystem 411 is dependent upon the communication network in which the mobile communication device 20 is intended to operate. For example, a mobile communication device 20 may include a communication subsystem 411 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile communication devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile communication device 20 may send and receive communication signals over the communication network 22. Signals received by the antenna 416 from the communication network 22 are routed to the receiver 412, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 22 are processed (e.g., modulated and encoded) by the DSP 420 and are then provided to the transmitter 414 for digital to analog conversion, frequency up conversion, filtering, amplification and transmission to the communication network 22 (or networks) via the antenna 418.

In addition to processing communication signals, the DSP 420 provides for receiver 412 and transmitter 414 control. For example, gains applied to communication signals in the receiver 412 and transmitter 414 may be adaptively controlled through automatic gain control algorithms implemented in the DSP 420.

In a data communication mode, a received signal, such as a text message or web page download, is processed by the communication subsystem 411 and input to the processing device 438. The received signal is then further processed by the processing device 438 for output to a display 422, or alternatively to some other auxiliary I/O device 428. A device user may also compose data items, such as email messages, using a keyboard 438 and/or some other auxiliary I/O device 428, such as a touchpad, a rocker switch, a thumb-wheel, or some other type of input device. The composed data items may then be transmitted over the communication network 22 via the communication subsystem 411.

In a voice communication mode, overall operation of the device is substantially similar to the data communication mode, except that received signals are output to a speaker 434, and signals for transmission are generated by a microphone 436. Alternative voice or audio I/O subsystems, such as a voice message recording subsystem, may also be implemented on the device 20. In addition, the display 422 may also be utilized in voice communication mode, for example to display the identity of a calling party, the duration of a voice call, or other voice call related information.

The short-range communications subsystem 440 enables communication between the mobile communication device 20 and other proximate systems or devices, which need not necessarily be similar devices. For example, the short-range communications subsystem 440 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art. For example, other example embodiments may utilize a pre-existing communication channel other than electronic mail to communicate the provisioning request and provisioning response messages between the mobile communication device and the enterprise server. For example, the provisioning request and provisioning response messages may be exchanged between the enterprise server and the mobile communication device using a Bluetooth link, a Wi-Fi link (i.e., IEEE 802.11), an infrared link, a telephone link, or by some other pre-established communication link. In addition, the technology described herein may also be used to provision a mobile communication device with systems other that a redirection system as illustrate in FIG. 1. For example, a mobile communication device may be wirelessly provisioned by exchanging provisioning request and provisioning response messages over a pre-established communication link with an electronic mail system that does not include an enterprise server or redirection capabilities.

It is claimed:

1. A method of provisioning a mobile communication device to operate with an enterprise server, the enterprise server being operable to communicate with a wireless gateway over a computer network to redirect electronic messages from an electronic mail (email) account to the mobile communication device, comprising:

generating a provisioning request message at the mobile communication device that includes a wireless identification to identify the mobile communication device in a wireless network and also includes an email address identifying the email account;

transmitting the provisioning request message over the wireless network to the wireless gateway;

using the email address to transmit the provisioning request message to the email account using an email transfer protocol;

monitoring the email account to detect the provisioning request message; and in response to detecting the provisioning request message in the email account, configuring the enterprise server to include the wireless identification.

2. The method of claim 1, wherein the provisioning request message includes a provisioning request identifier, and wherein the enterprise server monitors the email account for a received email that include the provisioning request identifier to detect the provisioning request message.

3. The method of claim 2, wherein the provisioning request identifier is included in a subject field of the provisioning request message.

4. The method of claim 1, wherein the enterprise server is operable to communicate with the wireless gateway using a direct TCP/IP level connection over the computer network.

5. A method of provisioning a mobile communication device to operate with an electronic messaging system, comprising:

generating a provisioning request message at the mobile communication device that includes a wireless identification for identifying the mobile communication device in a wireless network;

transmitting the provisioning request message from the mobile communication device to the electronic messaging system using a pre-established communication link;

detecting the provisioning request message at the electronic messaging system; and in response to detecting the provisioning request message, provisioning the electronic messaging system to include the wireless identification.

6. The method of claim 5, wherein the pre-established communication link uses a simple mail transfer protocol (SMTP) link.

7. The method of claim 5, wherein the pre-established communication link is a short-range wireless communication link.

8. The method of claim 7, wherein the pre-established communication link is a Bluetooth communication link.

9. The method of claim 8, wherein the pre-established communication link is a Wi-Fi communication link.

10. The method of claim 5, wherein the pre-established communication link is an infrared link.

11. The method of claim 5, wherein the pre-established communication link is a telephone link.

12. In a system for provisioning a mobile communication device to operate with an enterprise server, the enterprise server being operable to communicate with a wireless gateway over a computer network to redirect electronic messages from an electronic mail (email) account to the mobile communication device, the enterprise server comprising:

a communication subsystem operable to communicate over the computer network;

a memory subsystem operable to store data and program information;

a processing subsystem operable to store and retrieve data in the memory subsystem and execute programs stored in the memory subsystem, and cause to the communication subsystem to transmit and receive information over the computer network; and a provisioning program stored in the memory subsystem and executed by the processing subsystem, the provisioning program being operable to cause the enterprise server to detect a provisioning request message in the email account, the provisioning request message being sent from the mobile communication device to the email account over a pre-established communication channel and including a wireless identification for identifying the mobile communication device in a wireless network, and the provisioning program being further operable to store the wireless identification in the memory subsystem for use in redirecting electronic messages from the email account to the mobile communication device.

13. The enterprise server of claim 12, wherein the pre-established communication channel uses a simple mail transfer protocol (SMTP).

14. The enterprise server of claim 13, wherein the provisioning request message is an email addressed to the email account.

15. In a system for provisioning a mobile communication device to operate with an enterprise server, the enterprise server being operable to communicate with a wireless gateway over a computer network to redirect electronic messages from an electronic mail (email) account to the mobile communication device, the mobile communication device comprising:

a communication subsystem operable to communicate with the wireless gateway via a wireless network;

a memory subsystem operable to store data and program information;

a processing subsystem operable to store and retrieve data in the memory subsystem and execute programs stored in the memory subsystem, and to cause the communication subsystem to transmit and receive information over the wireless network; and a provisioning program stored in the memory subsystem and executed by the processing subsystem, the provisioning program being operable to cause the mobile communication device to detect a provisioning response message sent from the enterprise server over a pre-established communication channel and including a network identification for communicating with the enterprise server over the computer network, and provisioning program being further operable to store the network identification in the memory subsystem for use in communicating with the enterprise server.

16. The mobile communication device of claim 15, wherein the pre-established communication channel uses a simple mail transfer protocol (SMTP).

\* \* \* \* \*